Oct. 4, 1966            L. A. WILLIAMS            3,276,987
ELECTROLYTIC SHAPING APPARATUS

Original Filed Nov. 10, 1958            7 Sheets-Sheet 1

INVENTOR.
Lynn A. Williams
BY
Wupper, Bradolph & Love
Attys.

Oct. 4, 1966 L. A. WILLIAMS 3,276,987
ELECTROLYTIC SHAPING APPARATUS
Original Filed Nov. 10, 1958 7 Sheets-Sheet 2

INVENTOR:
Lynn A. Williams
BY
Wupper, Bradolph & Love
Attys

United States Patent Office

3,276,987
Patented Oct. 4, 1966

3,276,987
ELECTROLYTIC SHAPING APPARATUS
Lynn A. Williams, Winnetka, Ill., assignor to Anocut Engineering Company, Chicago, Ill., a corporation of Illinois
Original application Nov. 10, 1958, Ser. No. 772,960, now Patent No. 3,058,895, dated Oct. 16, 1962. Divided and this application Dec. 8, 1961, Ser. No. 158,042
16 Claims. (Cl. 204—224)

This application is a division of my application Serial No. 772,960, filed November 10, 1958, now Patent No. 3,058,895, entitled Electrolytic Shaping.

This invention relates to apparatus for the use of electrolysis in shaping of metal and metalloid materials.

It has long been known that metal and metalloid materials may be removed by electrolytic attack in a configuration where the metal or metalloid workpiece is the anode in an electrolytic cell. This principle has been used industrially to some degree for the removal of defective plating and the like, and is sometimes referred to as "stripping." It has also been used to some extent for electrolytic polishing in which application, however, the principal purpose is to produce a smooth finish with a minimum removal of the work material. Here the purpose is to remove substantial amounts of metal rapidly and with accuracy.

In the present instance, the term "metalloid" is used somewhat specially in referring to those electrically conductive materials which act like metals when connected as an anode in an electrolytic cell, and are capable of being electrochemically eroded. The term as used here and in the claims includes metals and such similarly acting materials as tungsten carbide, for instance, and distinguishes from such conductive nonmetalloids as carbon.

George F. Keeleric has proposed in his Patent No. 2,826,540, issued March 11, 1958, for "Method and Apparatus for Electrolytic Cutting, Shaping and Grinding," the use of electrolysis in conjunction with a metal bonded, abrasive bearing, moving electrode, and the method and apparatus of this Keeleric patent have found extensive industrial use.

The present invention departs from the teachings of Keeleric in utilizing relatively fixed or slow moving electrodes without abrasive, and is intended for work of a quite different character, as will appear in the detailed description of the invention which follows.

In general, in the present invention an electrode, quite frequently a hollow electrode, is advanced into the work material by mechanical means while electrolyte is pumped through the work gap between the electrode and the work, and at times the hollow portion of the electrode, under substantial pressure. In some circumstances the side walls of the electrode are protected by an insulating material so as to minimize removal of work material except where desired. Various forms of electrodes are used for different kinds of work, and likewise different techniques of advancing the electrode toward and into the work material are use, depending upon the nature of the operation to be performed. An important aspect of the invention lies in providing electrodes in which a flow of electrolyte between the electrode and the work is maintained at high velocity and across a short path between the point of entry and the area of exit regardless of the overall size of the electrode. An electric current is supplied so that current passes from the electrode, which is negative, through the electrolyte to the workpiece, which is positive. For purposes of shaping the electrodes, direct current may be passed in the opposite sense to make the electrode positive. In some instances, alternating current may be used.

Among the objects of the invention are the following:

To provide novel apparatus for rapid removal of work material by electrolytic means;

To provide novel apparatus for imparting desired shapes and contours to a workpiece by electrolytic action;

To provide a novel technique for producing shaped electrodes;

To provide automatic means for advancing electrodes toward and into the work material;

To provide novel mechanism for accomplishing variable feed rates for advancing electrodes toward and into work material for electrolytic removal thereof.

Other objects and advantages will become apparent from the following description taken in conjunction with the accompanying drawings, wherein.

Figure 1:
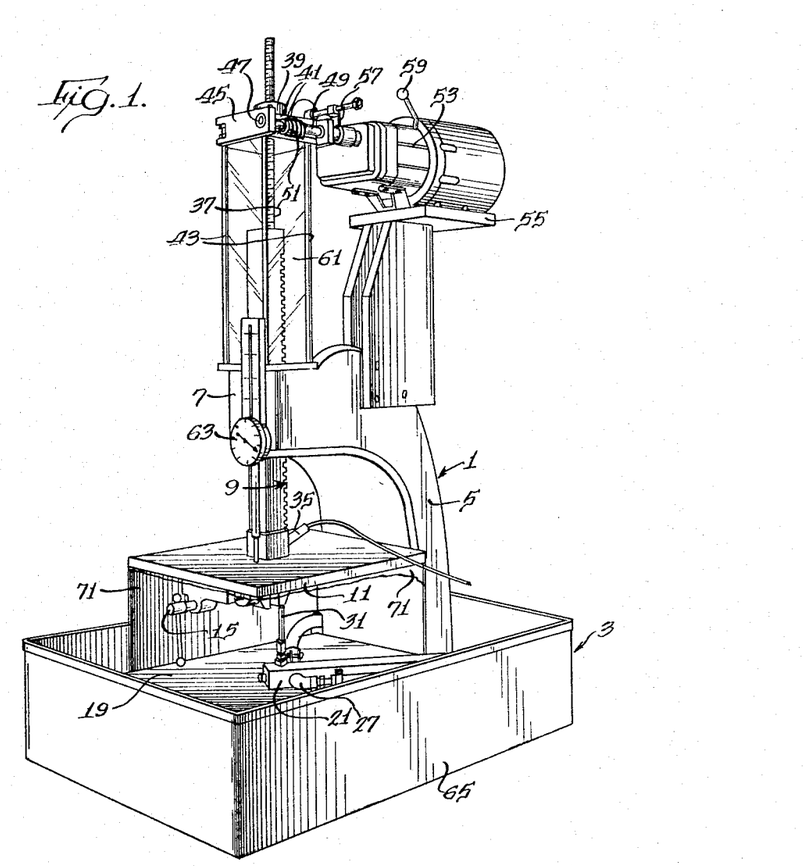
FIG. 1 is a perspective view of one form of electrolytic shaping apparatus embodying the present invention.

Referring to FIG. 1, the apparatus of this invention includes a frame member 1 which in this instance is the frame member of a conventional and well known arbor press sold under the trade name of Famco. It includes a base section 3, a column 5, and a head 7 which is adapted in the conventional manner to accommodate a ram 9 for vertical reciprocating motion. The detail of the ram mounting is not important to this invention, but it is desirable to provide adjustable gibs or the equivalent in the head so that the ram may move vertically with a smooth action and without lateral play which might introduce undesired side motion. To the bottom end of the ram 9 there is mounted a workplate 11 through which a plurality of bolt holes is provided to permit adjustable mounting of a work holding vise 15.

On the base portion 3 there is mounted a metal bottom plate and on top of this a waterproof chemical resistant plastic mounting plate 19. This is provided with a number of threaded bolt holes to permit mounting of an electrode holder 21, which is made of suitable metal and is provided with one or more mounting slots so that it can be adjusted as to its position by selection of the suitable bolt holes in mounting plate 19.

At the working end, the electrode support member 21 is hollow and is adapted to receive an electrolyte feed tube fitting 27 connected to a line leading to a source of electrolyte under pressure.

Extending from the upper surface there is mounted an electrode 31, shown here as fastened by brazing to a pipe nipple threaded into the electrode support member 21. Within the hollow support member 21 the electrode is connected by a suitable passage to the feed tube fitting 27.

An electric cable is connected to the electrode block or support member 21 and supplies current from the power source. Another electric cable 35 is fastened to work plate 11 to furnish the other (normally positive) connection from the power source.

To move the work plate 11 up and down, a lead screw 37 is secured to and extends upwardly from the upper end of the ram 9. A lead nut 39 is threaded upon the lead screw and is mounted between two horizontal plates 41 which are supported by four column bars 43. The lead nut peripherally is formed as a worm gear so that it may be rotated to move the lead screw 37 up and down. A journal plate 45 is mounted to the plates 41 and carries a bearing bushing 47 which supports the outboard end of a drive shaft 49 which carries worm 51 meshed with the peripheral worm gear of lead nut 39.

The worm drive shaft 49 is, in turn, rotated by a variable speed electric motor drive 53 mounted upon a platform 55 attached to the column 5. This drive mechanism has a speed adjusting handle 57 and a reversing handle 59, the latter having a neutral midposition as well as updrive and downdrive positions.

The sizes and proportions of the drive parts are arranged to permit adjustment in the vertical speed of movement of the work plate 11 from zero to one inch per minute. The motion must be smooth, not jerky, and accordingly reasonable accuracy and freedom from excessive friction are an advantage in the moving drive parts. The lead screw 37 may be protected against splatter and corrosion by a plastic enclosure 61 wrapped around the column bars 43.

A conventional dial indicator 63 is shown as mounted to the head 7 of column 5 and has its working tip extended downwardly against the upper surface of work plate 11 so as to indicate relative movement as between these elements.

The entire assembly is mounted in a pan 65 which has an outlet spud adapted to drain electrolyte back into a supply sump or reservoir 74. The work plate 11 is fitted with plastic curtains 71 which can be tucked down below the level of the pan top to prevent excessive splatter.

The plumbing system (FIG. 2) comprises a low pressure pump 73 which feeds electrolyte from the reservoir 74 through a filter 75 into high pressure pump 77, the outlet of which leads to a bypass valve 79 which may be either manually set or of the spring loaded constant pressure type. On the inlet side of the bypass valve 79 a pressure gauge 81 is mounted. Also from the inlet side, a pipe lead is taken through a needle valve 83 to an electrolyte feed tube 84 leading to the electrode fitting 27. A second gauge 29 is connected to the feed tube 84 so as to indicate the pressure at the electrode.

Figure 2:
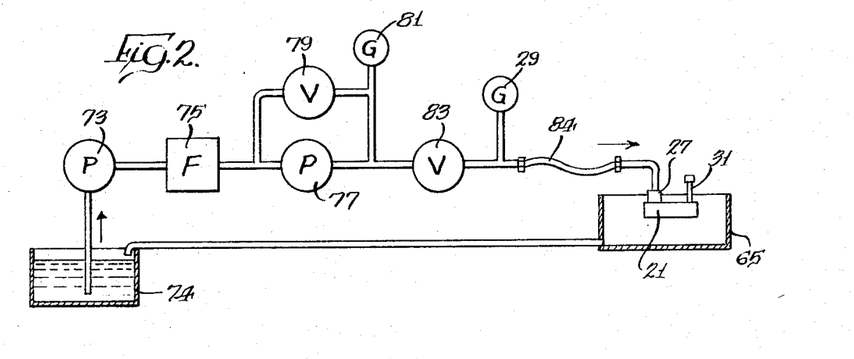
FIG. 2 is a diagrammatic representation of an electrolyte supply system which forms a portion of the apparatus of FIG. 1.

In operation, a workpiece is positioned in the vise 15 above the electrode 31, and the work plate 11 is then driven down until the workpiece is almost touching electrode 31 as gauged by a piece of paper or shim of known thickness, say .003 inch. The dial indicator 63 is then adjusted to zero minus the known thickness, .003 inch in this example. The curtains 71 are lowered or otherwise closed, the electrolyte pumps 73 and 77 are started, and the valves 79 and 83 are adjusted so that gauge 81 reads about 120 p.s.i., and gauge 29 about 90 p.s.i. This is done while the reversing handle 59 is in neutral position. Then, simultaneously, the reversing handle is moved to down drive position, and the electric power supply is turned on.

As the electrode approaches the workpiece, there will be a rise in pressure at the gauge 29. If the capacity of pumps 73 and 77 is several times the free flow discharge rate through the electrode, the pressure upstream of the needle valve 83 and of bypass valve 79 as read at gauge 81 will change scarcely at all with changes in proximity of the electrode 31 to the work, for most of the flow is passing through bypass valve 79, and it is the adjustment of this which is principally determinative of the pressure at gauge 81. In short, the pumps and plumbing system up to needle valve 83 constitute a substantially constant pressure source. The same result may be obtained in many other ways. A constant pressure type pump may be used; e.g., a centrifugal pump operating near cutoff. Or a pressure regulator may be used. Or a spring loaded relief valve adapted to maintain constant pressure may be used.

Needle valve 83, however, is set so as to constitute a sufficient restriction to flow so that when the electrode is discharging into the open, the pressure, as read at gauge 29, will be noticeably lower than when its outlet is restricted by being in close proximity to the work.

Thus, if gauge 81 normally reads 120 p.s.i., then when the electrode 31 touches the workpiece so as to shut off the flow, or nearly so, the pressure downstream of needle valve 83 as read at gauge 29 will rise to almost the same value, 120 p.s.i. If, however, the electrode 31 is spaced away be several thousandths of an inch, the pressure at gauge 29 will drop, say to 90 p.s.i.

This change in liquid pressure may be used in adjusting the rate of feed of the work toward the electrode. The initial feed rate may be set at a low level (for an unknown working condition or work material), and then increased by adjustment of the handle 57. Gauge 29 is observed to watch for a pressure rise which approaches that of gauge 81. It takes a little time for the pressure reading to stabilize during actual removal operations, for inasmuch as material is being removed by anodic dissolution, it is necessary for the moving electrode to catch up with the receding work material and to establish an equilibrium spacing distance, for as the electrode comes closer to the work, the removal rate tends to increase. By the exercise of reasonable care, it is possible to make a precise adjustment such that the electrode pressure gauge 29 reads only a few pounds per square inch lower than gauge 81, indicating that the electrode is moving forward at such a rate as to leave only a small gap between the electrode and the work.

In effect, this hydraulic system constitutes a flow meter, and the same result may be obtained by using a more formal flow meter to sense the flow rate through the gap between the electrode and work. Such flow meter may be of any suitable sort, as for instance of the orifice type (which, in effect, uses the principle of the system just described), or of some other type, for example, that in which a moving bob is supported by upward flow in a conical glass vessel (e.g., the Fischer & Porter type).

It is not easy to measure this gap with accuracy, as apparently it is not always uniform at every point, but as measured in a practical way, by turning off the current and advancing the electrode until it seems to bottom, the distance may be as small as .001 inch or less, to as much as .010 inch, with satisfactory results, although it is preferred to work with the shortest spacing distance which can be managed without causing occasional contact and arcing between the electrode and the work, and I have found that about .002 inch to .005 inch is usually a safe distance while still permitting rapid removal of work material.

In general, low voltages and close spacing, of the order of .001 inch to .005 inch, give high removal rates and low electric power costs and a higher degree of accuracy, but less striation is produced upon the side wall of the work cavity when greater spacing, of the order of .010 inch, is used. The greater spacing results in a lower work removal rate unless the voltage is raised, however, since removal rate is a function of current. As a practical matter in most applications, I prefer to use about 10 volts and from 100 to 3000 amperes per square inch of active electrode area.

It should be noted that work material is removed by electrolytic action, not by spark or arc erosion as with the so called electrodischarge method. This is important for several reasons, among them the fact that damaging thermal metallurgical effects on the work material are avoided and that there is virtually no erosion of the electrode. The fact that the electrode is not eroded is of great importance where the cavity is to be accurately shaped, for accurate shaping is rendered very difficult when the electrode is being eaten away at a rate rapid enough to alter its dimensions during the operation.

Thus, it is important to avoid too fast a feed rate which may cause arcing between the electrode and the work.

Another method of gauging the feed rate is by reference to an ammeter in the electrolytic power supply circuit. Once the penetration of the electrode into the work has been well established, the rate of feed is gradually increased until an arc is observed. Usually this will be of short duration. The reading of the ammeter is observed and read just prior to the first arc, and the speed is then adjusted downwardly until the ammeter shows a reading of little below the critical point where the first arc occurred.

A transducer sensitive to either the electrolyte liquid flow rate or the electrolytic electric current may be used as the signal generating element in an automatic feed control system.

Figure 3:
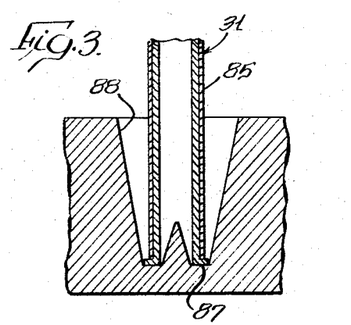
FIGS. 3 and 4 are transverse sectional views taken through a typical electrode used in the apparatus of the present invention, and the work associated therewith, showing the influence upon the work of the speed of advance of the electrode.
Figure 4:
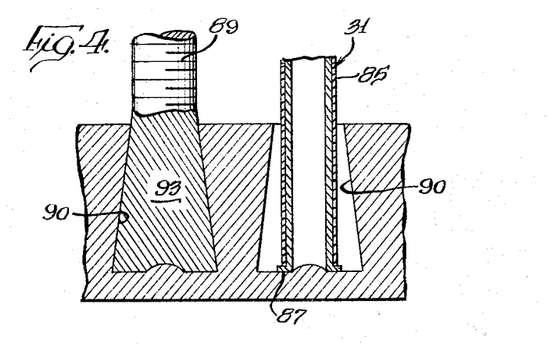

If the electrode 31 used is of the general type illustrated in FIGS. 3 and 4, for instance, in which the exterior surface is insulated as at 85 by a ceramic coating or the like, with only a narrow lip 87 at the exposed end, then if the electrode is advanced at a constant rate the cavity produced will have substantially straight sides, for the electrolytic removal on the sides of the cavity will be substantially uniform. If, however, the rate of advance of the electrode is slowed, there will be a widening of the cavity because of the longer exposure to side action. Conversely, if the rate at the beginning is slow and is then accelerated, the cavity will be narrower. By reference to the liquid pressure at gauge 29 as previously described, or to some other form of flow measurement, the penetration rate may be varied so as to produce variations in the lateral dimensions of the cavity.

A similar result may be obtained by reference to the ammeter in the electrolytic power circuit.

Referring to FIG. 3, a tapered cavity 88 may be produced by the step of adjusting the feed rate of the electrode into the work during the progress of the "cut" from a very slow rate at the outset to a rate approaching the maximum permissible. In FIG. 4, a rather startling result, the production of a reverse taper 90 larger at the bottom than at the opening, is illustrated. This is accomplished quite simply by starting with the maximum feed rate obtainable without arcing, which is then gradually reduced to a very slow rate as the cut progresses.

The ordinary taper, as in FIG. 3, may be used in such applications as the making of integral turbine blades in the periphery of a disc of super-alloy material. Since the blades to be left standing are thinner at the tips than at the root, and since the circumference of the disc is greater at the tips, it follows that the major portion of the material between the blade portions must be removed at the beginning of the "cut," with progressively less material being removed toward the root. The effect may be increased by omitting the insulation 85, or by using an imperfect insulating layer on the electrode and by eliminating the projecting lip 87 at the working tip. These and other factors influencing electrode design will be described in greater detail subsequently.

The reverse taper 90 shown in FIG. 4 may be made with a cylindrical electrode and may be used where it is desired to anchor a bolt, stud, or the like. If the part 89 to be anchored is somewhat ductile, it may be driven into the reverse tapered cavity 90 with enough force to cause the end portion to flow and expand within the cavity as at 93, substantially filling it, and thus providing a very firm fastening.

Figure 5:
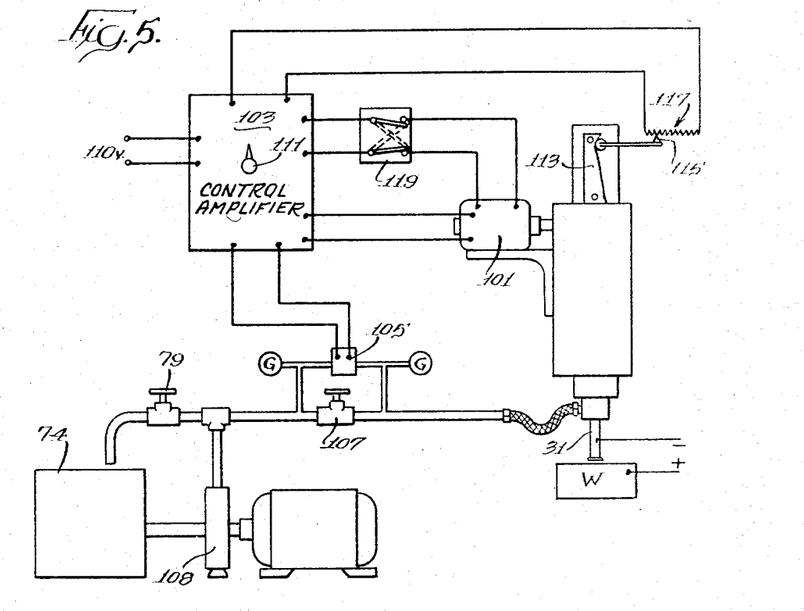
FIG. 5 is a diagrammatic representation of apparatus embodying the present invention, showing one control mechanism therefor including an arrangement for controlling the speed of advance of the electrode.

FIG. 5 is a schematic illustration of one type of apparatus for automatic control of the feed rate of the electrode. Motor 101 is of the direct current, shunt wound type, and serves to advance the electrode 31 toward the work W (or the work W toward the electrode) by a screw drive, all in the general manner shown in FIG. 1, except that the speed of motor 101 is varied electrically and automatically rather than manually. Other suitable mechanical configurations will be self-suggesting.

The electric supply system and amplifier 103 include rectifier circuits to provide a relatively fixed direct current voltage for the field of motor 101 and an automatically adjusted voltage for the armature so that the motor speed is automatically varied with a variation in armature voltage. The amplifier 103 derives a signal from a pressure responsive transducer 105 (FIG. 6) arranged to respond to the pressure differential across the needle valve at 107 which is in the line between the pump 108 and the electrode 31. As one example, a diaphragm device or other pressure responsive sensing element may be mounted so that the liquid pressure differential thereacross causes a variation in pressure upon a carbon pile variable resistor 109 connected in a bridge circuit as in FIG. 6. For this purpose, however, I prefer to use a variable impedance, for example, a pressure actuated variable capacitor, in an oscillator circuit feeding the output to a discriminator to derive a control signal. As the value of the capacitor changes, it alters the oscillator frequency, and this affects the signal. All this is conventional and well known, and needs no detailed description.

The change in pressure is thus used to provide signals to the grid of a vacuum tube amplifier which terminates in one circuit I have used in a pair of 807 power tubes. The output tubes may be fed with alternating current from a transformer split secondary, and they thus serve as rectifiers as well as amplifiers and provide a variable direct current supply to the motor armature. The amplifier circuit is so arranged that an increase in pressure differential across the transducer element 105, which reflects an increase in the electrode to work spacing, causes an increase in power output, thus causing the motor speed to increase, which in turn causes the electrode to catch up to the receding work face.

Accordingly, the system serves to maintain a feed rate which is held at a level to maintain constant liquid flow in the electrolyte feed line as sensed by a constant differential pressure across adjustable orifice or valve 107. This assures substantially constant spacing between the electrode 31 and the work W. In some situations there will be a tendency for the circuit to hunt, and antihunting circuit techniques may be required. Thus, the gain of the amplifier may be made adjustable as by the knob 111; capacitance with a slow bleed and a resistance feed may be connected across one of the grid circuits, etc. These techniques do not relate to the novelty of this invention and are, therefore, not described in detail, for those skilled in the art will understand how to deal with such common circuit problems.

Figure 6:
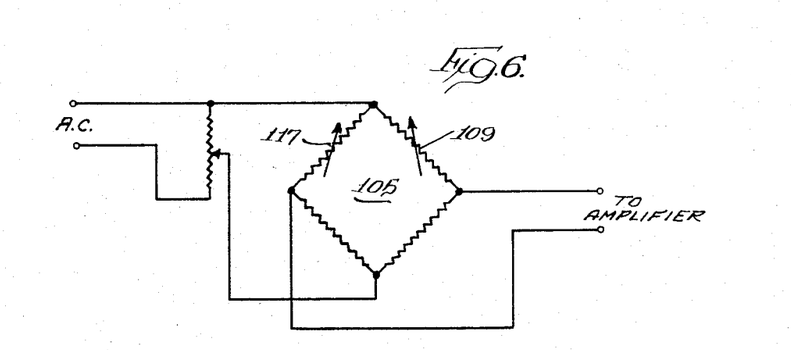
FIG. 6 is a circuit diagram of a portion of the control system of the apparatus of FIG. 5.

If it is desired to alter the feed rate during the progress of a "cut," this may be provided by mounting a cam element 113 linked to and moving with the electrode 31. The cam is arranged to move the slider 115 of the variable resistor 117 (which may be regarded as any appropriate variable impedance) in circuit with transducer element 109 in such manner as to vary the level at which signal response occurs. In FIG. 6, resistors 109 and 117 are balanced against each other in a simple bridge circuit, and should be regarded as representative of any variable impedance, whether resistive, capacitive, or inductive. The cam will be shaped to alter the feed rate as desired to produce the variations in width of cavity which are wanted. It should be understood that where the transducer element 109 is not of the resistance type, then element 117 need not be a resistor. If, for example, transducer 105 is a variable capacitor, then element 117 may be a variable capacitor; or if 105 is a variable inductor, then element 117 will be a variable inductor.

The system just described constitutes a flow meter for a sensing and control device in which the flow rate range may be set for the desired response level, depending upon the area of the electrode. Other types of flow meters capable of providing an electrical control signal may be used; for example, a magnetic flow meter in which an A.C. magnetic field is impressed across a nonconductive section of electrolyte feed line and two electrodes set in a plane transverse to the field. The electrolyte acts as a moving conductor in the field, and its velocity determines the voltage generated. The directly induced A.C. is canceled out electrically, and thus a signal is derived whose voltage is linearly proportional to flow rate.

The reversing switch at 119 enables the motor 101 to run in either direction so as to extend or retract the electrode 31 as desired.

Figures 7, 8:
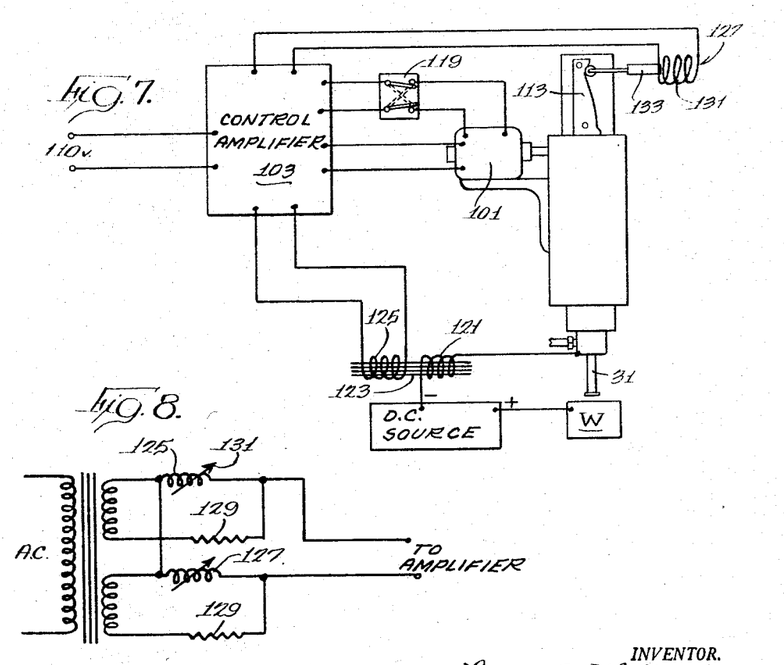
FIG. 7 is a diagrammatic representation of the apparatus of the general character of FIG. 5, but showing an alternative control arrangement therefor.
FIG. 8 is a diagram of a portion of the apparatus of FIG. 7.

FIGS. 7 and 8 show an alternative arrangement to that of FIGS. 5 and 6. All parts are similar and bear like reference numerals except that the automatic feed control is responsive to the electric current passing between the electrode 31 and the work W. Variation in the current in series coil 121 affects the saturation of the iron core 123 which in turn is reflected in a change in inductance of coil 125. This mechanism, therefore, acts as a variable inductance which can be used to modulate the output of the amplifier 103. When the electrolytic current rises above a predetermined level, the voltage to the armature of motor 101 is reduced to slow the speed of advance.

Variable speed is accomplished by the same type of cam system used in the apparatus of FIG. 5. One form of interconnecting bridge circuitry which may be housed principally within the amplifier box at 102 is shown in FIG. 8.

Variable inductor 125 responsive to current value is balanced against variable inductor 127 actuated by cam 113 in a circuit with fixed resistors 129 such that the level of amplifier response is varied in accordance with the electrolytic current in the circuit and the position of the electrode. Variable inductor 127 may be of any suitable type such as a coil 131 having a movable core 133 attached to the follower of cam plate 113.

Figure 9:
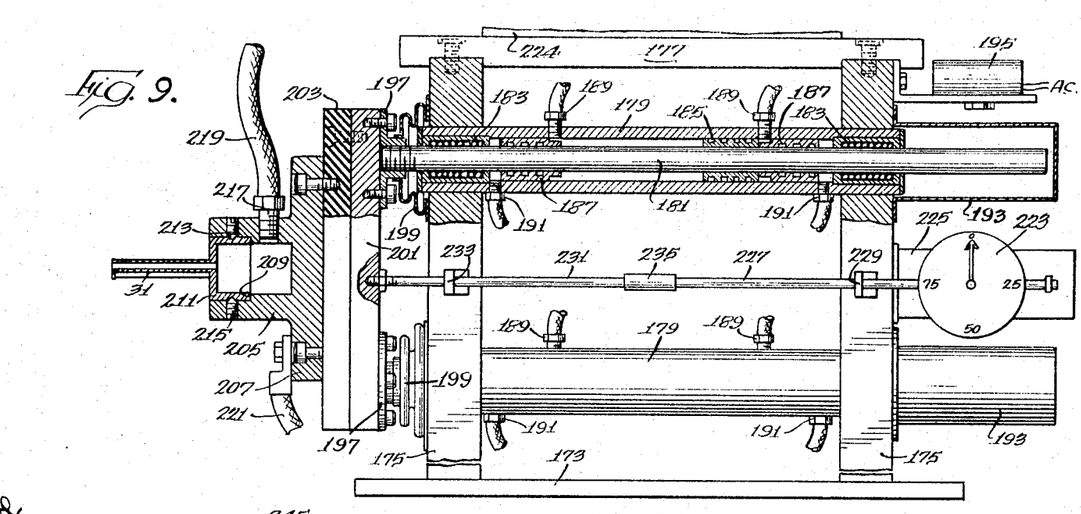
FIG. 9 is a side view, partly in section, of yet another form of the apparatus which inherently advances the electrode into the work at the proper rate.
Figure 10:
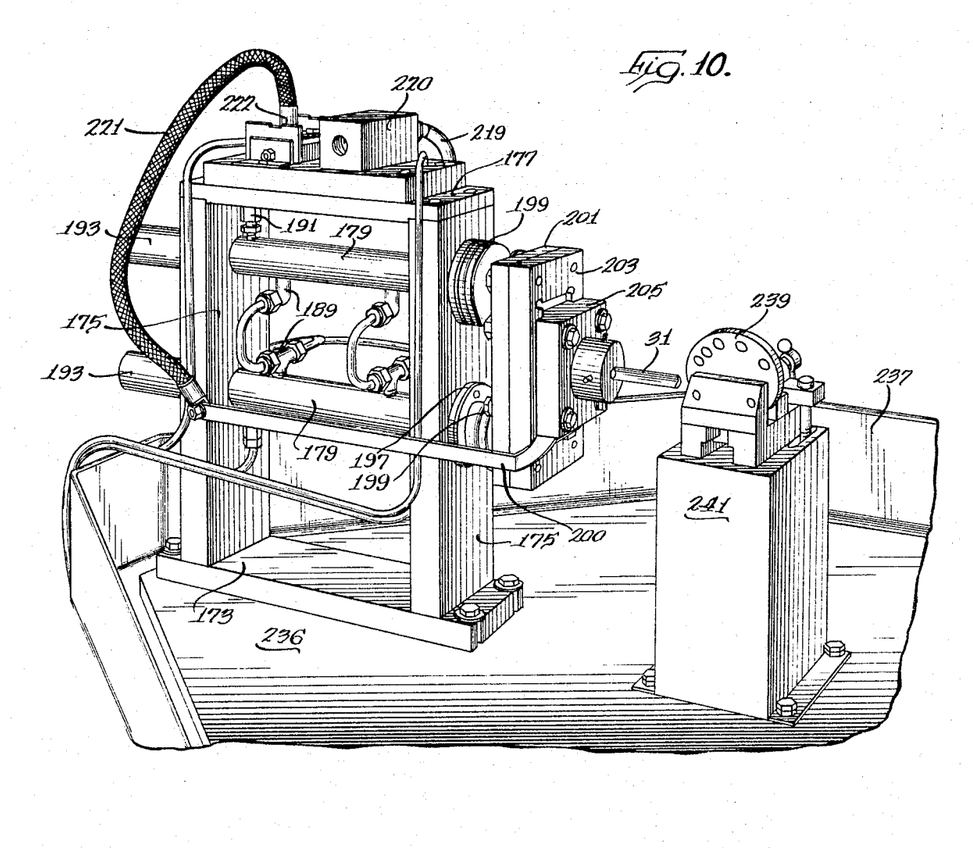
FIG. 10 is a perspective view of the apparatus of FIG. 9.
Figure 11:
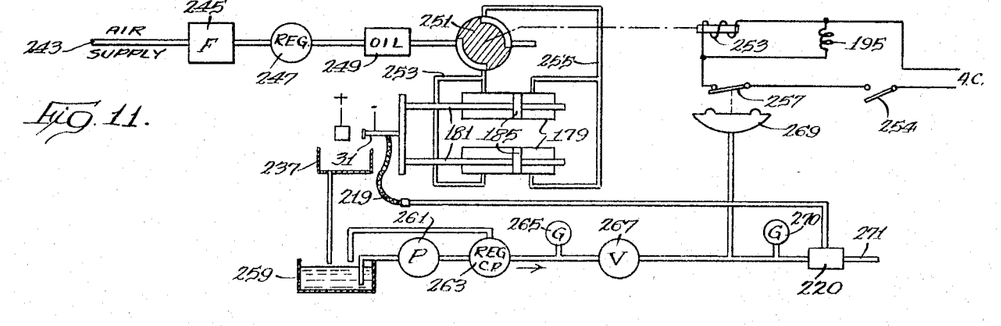
FIG. 11 is a diagrammatic representation of the electrical, pneumatic, and electrolyte supply system for the apparatus of FIGS. 9 and 10.

FIG. 9 shows in elevation and partly in section a fluid operated drive for moving the electrode of this invention into a workpiece. FIGS. 10 and 11 also illustrate this form of apparatus.

A frame is provided consisting of a base 173, two uprights 175 and a top member 177. These are made of stainless steel and are bolted or welded together. Two stainless steel cylinders 179 are forced into bored openings in uprights 175 so that they are in parallel alignment.

Each cylinder has a hardened push rod 181 adapted to reciprocate in linear ball ways 183 pressed into counterbored ends of the cylinders 179.

Each push rod 181 has a piston 185 which is pressed into position upon the rod. The piston has a series of annular grooves to serve as a labyrinth seal against excessive leakage, but no cup leathers are used as it is desired to avoid rubbing friction. Piston 185 has a radial clearance of the order of .001 inch to .002 inch relative to the bore of the cylinder.

At each end of both cylinders, there is a labyrinth seal element 187 in the form of a bushing press fitted into the bore and having internal annular grooves to reduce leakage. These also clear the push rod by a few thousandths of an inch.

Each piston and cylinder assembly is put together by first pressing one seal into position, then inserting the push rod with its piston already in place, then pressing the other seal in place, and finally, pressing the linear ball ways into position, sliding them along the push rods to do this.

Seals 187 are turned down at their inboard ends, and the space thus provided beyond the piston and in communication with the cylinder is connected to the outside through threaded tube fittings 189.

The inner ends of seals 187 therefore serve the dual purpose of acting as stop abutments against pistons 185 to limit the travel of push rods 181 and also provide annular channels to permit entry and exhaust of air even when the push rods are at the limit of their stroke.

Vent holes 191 are provided at both ends of both cylinders to exhaust any blow-by of air which leaks past seals 187. The vent holes are threaded to receive tubes which are led to a position remote from the work area. This prevents electrolyte splatter and mist from entering the air cylinders where it might gum up the working parts.

Canisters 193 enclose the back ends of the push rods to seal them against dirt and electrolyte splatter.

An electric vibrator 195, which vibrates in response to 60 cycle current, is attached to one of the uprights 175. Its purpose here is to impart a slight vibratory motion to the assembly to minimize any tendency of the moving parts to stick. Additional vibration in a plane transverse to the path of electrode motion may be used to vibrate an electrode tip to avoid pattern effects from a composite electrode, e.g., the bundle of tubes type.

At the working end of the push rods flanges 197 are pressed or threaded onto the rods (before assembly), and synthetic rubber telescopic boots 199 are sealed to the flanges and the face of the adjacent upright 175 by clamp rings (not shown). To the flanges 197 there is bolted an intermediate stainless steel plate 201, and to it, in turn, is bolted an insulating mounting plate 203 of Teflon, nylon, or similar material, which is waterproof and should be impervious to the electrolyte solution being used. The bolt holes should be countersunk and plugged to prevent access of electrolyte to the bolts.

To the insulating plate 203 may be mounted any desired electrode holder for holding the electrode 31. Here, this consists of a stainless steel body 205 having an integral flange 207 adapted to be bolted, as shown, to the insulating plate 203. The body is counterbored, leaving a shoulder 209. The electrode 31 proper is mounted to a cylindrical base 211 having an external V-groove 213. Opposite this groove in the body 205 are provided threaded holes to receive set screws 215. These are pointed, and the screw holes are so located that the points of the screws engage the inner face of the V-groove 213 so that when the screws are tightened there is a wedging action between the screw tips and the inner face of the V-groove which drives the electrode base 211 firmly against the shoulder 209. This makes an adequately sealed joint, as some small leakage of electrolyte is of little consequence.

A screw threaded tube connection 217 is opened through the body 205 into the counterbored section, thus communicating with the liquid passage in the electrode 31. A flexible tube 219 leads to a junction connection 220 for the electrolyte supply line. The top surface of top member 177 is one convenient location for such a junction connection. Similarly, a flexible electrical cable 221 is led from flange 207, to which it is bolted, to a suitable junction for connection to the main power supply cable from the power source. Alternatively, a heavy copper strip 200, shown in FIG. 10, could be bolted at one end to the flange 205 and arranged to extend outwardly and thence rearwardly for connection to the end of the cable 221. It is convenient to do this by carrying the cable 221 to a metal junction member 222 mounted on an insulating block 224 atop top member 177 and in front of the liquid junction previously referred to.

Both the tube 219 and the electric cable 221 must be quite flexible so as not to interfere with the motion of the electrode, and enough extra length must be provided so that there is not much change in force exerted by or against these members during motion of the electrode.

A dial indicator 223 is mounted on a suitable bracket 225 with its stem 227 extending forward through guide 229 on the side of rear upright 175. The stem is engaged by a push rod 231 fastened by screw threading into intermediate plate 201 near its adjacent edge so that the push rod passing through a guide 233 on the forward upright 175 engages the stem 227 to which it is attached by a friction fit rubber collar 235, thereby permitting elimination of the retracting spring in the indicator assembly, which otherwise interferes with proper balance of the forces involved in the system.

FIG. 10 shows the above assembly mounted for work. The assembly of FIG. 9 is mounted by its base member 173 to a stainless steel plate 236, which in turn is set within a stainless steel pan 237. Both are mounted on a stand (not shown). A transparent plastic enclosure (not shown) covers the work area, its back wall being notched for boots 199 and for push rod 231 and provided with openings for the tube 219 and the cable 221. The enclosure rests on short legs to lift it above the bottom of pan 237 but it still extends well below the pan's upper edge. Thus, ventilation is afforded to the work area, but splash is retained within the pan. A powered exhaust blower (not shown) may be connected to the enclosure by a suitable duct, and thus all fumes may be drawn away from the operator.

The work 239 is mounted on a suitable pedestal 241 in front of the electrode 31 and is positioned so that the cavity to be formed will be in the desired position in the work. In a typical situation, a rotary indexing table may be mounted to hold a disc of super-alloy material so that its edge is toward the electrode in close proximity to it when the electrode is retracted. Then the electrode is advanced to "cut" a cavity constituting the interspace between two turbine blades. The electrode is then retracted, the disc is indexed to the next interspace position, and the operation is repeated. By progressing around the disc in this way a full set of turbine blades is provided, all integral with the remaining central portion of the original disc.

Turning to FIG. 11, there is shown a schematic diagram of the hydraulic (electrolyte), air, and electrical hookup of the apparatus of FIG. 9. An air supply line 243 leads through a filter 245, a pressure regulator 247, an oil bath 249, and thence to a valve 251 actuated by a solenoid 252 controlled by push button controls (not shown) which actuates switch 254 in a convenient location. From the solenoid valve, tubes 253 and 255 lead to the two air connections 189 on each cylinder, which are connected together in the same sense at each end. The solenoid valve is of the type (and is so connected) that when deenergized the valve takes the position to send air under pressure through line 253 to the cylinders in a direction to cause retraction of the electrode. Thus, in the event of accidental power failure, the electrode moves away from the work instead of the opposite. As a safety device, the solenoid valve control circuit is interlocked with an adjustable pressure switch 257 in the electrolyte supply line so that if the electrolyte falls below a predetermined level the solenoid electrical supply is cut off, causing retraction of the electrode. The electrical control circuit for the solenoid valve as shown includes the on-off switch 254.

The electrolyte supply is fed from a reservoir 259 by a pump 261 capable of supplying the requisite amount of electrolyte (depending on electrode area) at a pressure of from 100 to 200 p.s.i. The electrolyte then passes through one or another form of pressure regulator 263 (which may be essentially a manually controlled bypass valve) to a first gauge 265, through a needle valve 267, then to the actuator 269 for the pressure switch 257, then to a gauge 270, and thence to the junction block 220 on the top member 177 of the assembly of FIG. 10, and then through tube 219 to the electrode holder, and so into the electrode 31. It has been found that the system works more smoothly and with complete freedom from hunting when needle valve 267 is connected to the electrode through a length of four to eight feet of neoprene hose which, being slightly expansible, seems to provide a kind of damping or smoothing action. A thermometer 271 is mounted in the junction block 220 to indicate the temperature of the electrolyte. From the electrode, electrolyte falls into the pan 237 and is returned to the reservoir 259.

The electrolyzing current is fed from the direct current source to the work by a heavy cable, usually by connection of the positive terminal to the work pedestal or holder or to a stainless steel base plate (not shown). The other (negative) supply cable leads to a junction on an insulating block 224 on top member 177 as previously explained.

Vibrator 195 is connected to the power input line to the solenoid valve coil 252 so that the vibrator is energized whenever the solenoid valve is energized so as to be in position to cause the electrode to advance toward the work.

The mode of operation is as follows. After the work is positioned, the electrolyte supply pump is energized, and the control button is pushed to advance the electrode against the work. Air pressure acting on pistons 185 urges the electrode toward the work, while hydrostatic pressure of electrolyte at the electrode tip tends to force it away. By regulating the needle valve 267 in the electrolyte supply line, a restriction is established such that when the electrode is very close to the work the pressure rises because of the narrow gap for exit, but when the gap widens the pressure immediately drops. Thus an equilibrium position is reached at which the forces exerted, respectively, by the air on the pistons and the electrolyte on the working tip of the electrode are balanced. This balance may be adjusted, by adjustment of air pressure and of the needle valve, so that the equilibrium is reached at any spacing from .001 inch, or even less, to .012 inch away from the work. This can be checked by observing the dial indicator 223 and pushing the electrode forward manually until it bottoms against the work. All of this adjusting and checking is done without any electrolyzing current. When these conditions have been appropriately established, the current is turned on and immediately the indicator will show the advance of the electrode into the work. As the electrolytic action dissolves away the work material, this tends to open the exit gap between the electrode and the work, thus tending to reduce the hydrostatic back pressure so that the air actuated piston moves the electrode forward into equilibrium. In actual operation this occurs very smoothly, and one sees on the dial indicator only a smooth steady progress. If the work is stopped, by turning off the electrolyzing current at any point, it will be found by advancing the electrode manually until it bottoms, the predetermined spacing distance will be maintained with high accuracy.

It is not necessary that air be used to advance the electrode. Any other fluid medium under pressure will be satisfactory.

Figure 12:
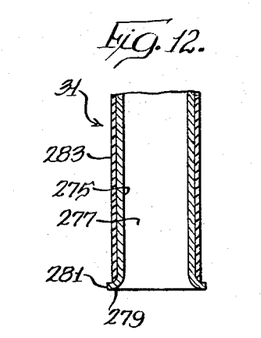
FIG. 12 is a longitudinal medial sectional view through a typical electrode, showing the general arrangement and conformation of the elements thereof.
Figure 13:
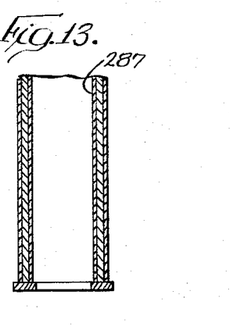
FIG. 13 is a view generally similar to FIG. 12, but illustrating an electrode adapted for a trepanning operation.

FIG. 12 illustrates a form of electrode for making simple cavities. The electrode generally designated by reference number 31 may be made of a copper body 275, although stainless steel or titanium are better for most purposes since they have less tendency to acquire plating deposits. It has a central passage 277 and at the working tip 279 is a flange or laterally extending lip 281. In practice, this lip may project beyond the body 275 by about .010 inch to .030 inch or more. In the axial direction, the thickness of the lip may be from .010 inch to .030 inch or more, but I prefer to make it about .020 inch to .030 inch. The lip may taper in thickness so as to have a much thicker section near the body and quite a narrow section at its extremity. The purpose in keeping the lip thin is to minimize the area exposed in such a way as to minimize side action, that is, the removal of material from the sides of the cavity as the electrode penetrates the work.

Some amount of side action seems unavoidable, but the use of a narrow edged lip holds this to a minimum value, and moreover, helps to keep the amount of side action fairly uniform so that the side walls of the cavity can be kept straight and so that cavities of the same size can be produced repetitively. I find that side action can easily be held to about .005 inch (.010 inch on the diameter) and reproducibility can be held to within a few thousandths of the given dimension. Accuracy is dependent not only upon the electrode but on holding a constant feed rate, constant electrical voltage, and constant temperature of electrolyte. A cooled heat exchanger may be installed in the electrolyte tank to hold the electrolyte down to a predetermined temperature. Pumping against a bypass restriction will have the effect of raising the electrolyte temperature appreciably. Additionally, immersion heaters with thermostatic control and other well known expedients may be used to maintain the desired temperature which, for good chemical reactivity, is preferably within the range of 120° F. to 160° F. at the input to the electrode.

The body 275 of the electrode is coated with a ceramic or vitreous enamel layer 283 which is better for this purpose than any organic coating I have found. For this purpose I have used ceramic oxide frits of the kind commonly used for decorative enameled jewelry, or the kind used for protection of electrical resistors of the heavy duty type. The frit is mixed with water and agar to make a creamy suspension, which is applied to the electrode body with a spray gun. Then the electrode is placed in an oven or kiln and fired to 1500° F. to 1800° F. or whatever is required to fuse the particular frit being used. The enamel layer 283 which is thus formed should be free of discontinuities, and it may be necessary to apply one or more additional layers to insure this. The coating should be reasonably uniform in thickness and should not extend sidewardly beyond the projection of lip 281, for if it has humps which extend too far, they will bump the side wall of the cavity as the electrode advances and deflect the electrode sideways, which may produce a crooked hole or cause the lip 281 to strike the side wall of the cavity, causing a short circuit and arcing, with consequent possibility of damage both to the electrode and to the work.

The purpose of the enamel coating is to utilize its insulating properties to minimize electrolytic side action between the electrode body and the side walls of the cavity. In some instances, however, where the lip 281 extends a substantial distance, this insulation is not required, and very little side action is observed without it. The explanation for this is believed to be as follows: When the electrode tip is in close proximity to the frontal working face of the work, the gap for the escape of electrolyte is only a few thousandths of an inch. Thus the electrolyte exiting under the tip under substantial pressure has high velocity as it enters the much larger space behind the tip. With a small amount of electrolyte at high velocity many discontinuities are created so that electrolytic conduction to the side walls is impaired sufficiently to prevent substantial removal of material, and in addition, it is possible to operate at a high enough voltage and current density so that electrolyte in the narrow work gap is heated above its normal input temperature, between 120° F. and 160° F. and also, some gas is involved.

Within the confines of the work gap, however, the liquid is held under a relatively high pressure of several atmospheres so that its boiling temperature is considerably elevated. I have commonly used electrolyte pressure of the order of 100 p.s.i. gauge. When the liquid passes beyond the lip 281 into the relatively open space behind it, there is, in the first place, not a very high mass flow because of the restriction of the narrow work gap, but the liquid has high velocity because of the pressure and can be observed to foam as it exits. It is conjectured, therefore, that the electrolyte in the space between the body 275 and the wall of the cavity as it exits at high velocity from the work gap becomes almost instantly full of discontinuities due to gas bubbles either from boiling or electrolytic decomposition in the work gap, or both, so that conductivity from the body 275 to the side wall is quite poor.

Whether or not this is the explanation, the fact is that in cavities up to an inch in depth, there does not seem to be much side action when a lip of substantial protrusion is used. Notwithstanding this, it is preferred to use an insulating coating, as the finish on the side walls of the work seems to be better in most cases when this is done.

Vitreous enamel is the best coating I have found, but other insulating materials may be used. I have found Teflon quite satisfactory where it can be easily applied. However, the organic lacquers and paints which have been tested have not been very satisfactory because they seem to be chemically or physically attacked near the working tip. The vitreous enamel seems to be quite impervious to such deterioration.

Copper is a good substance for forming the electrode because it is a good electrical conductor, but good success has been had with cold rolled steel. Brass may be used, but it is difficult to get a good vitrified enamel coating on brass, and accordingly it is not preferred. All of these materials are, in general, somewhat less satisfactory than stainless steel or titanium in that they are susceptible to the formation of plating deposits which, under some conditions, may make the outline of the electrode less clean, and in some instances such deposits may change the current flow characteristics of the system.

It is a part of the inventive idea to give attention to means for allowing the electrolyte to escape without first traveling a long distance in the electrolytic field between the electrode and the work. A number of means of doing this with consequent opportunity for performing very useful and unique work is illustrated in the following exposition of several different types of shaping electrodes. The purpose, in part, is to permit not only the formation of cavities of a desired cross sectional shape, but also the formation of cavities having shaped compound contours in three dimension, as for example, in producing a forging die.

Figures 14, 15, 16:
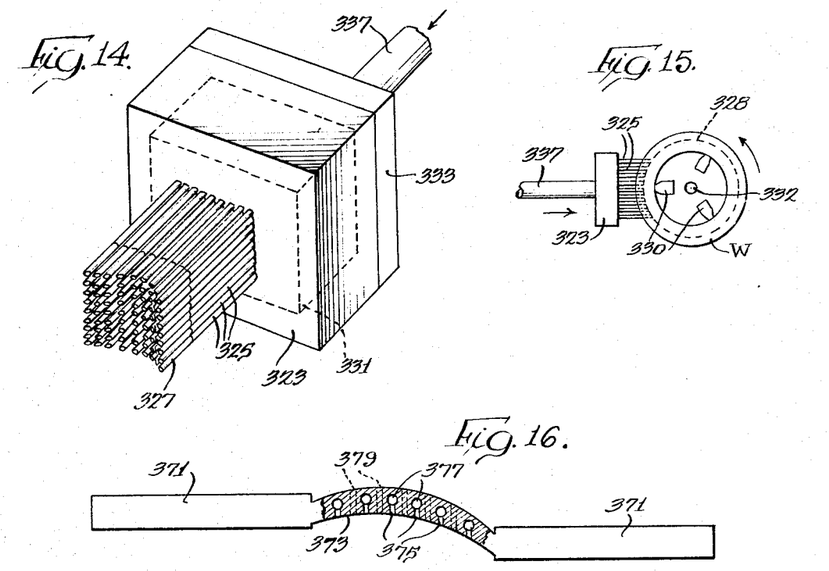
FIG. 14 is a perspective view of one type of electrode for forming comparatively large cavities of irregular shape in the bottom surface thereof.
FIG. 15 shows an adaptation of the electrode of FIG. 14 for operation on a rotating workpiece.
FIG. 16 is a side view, partly in section, of an electrode adapted for use for the finishing of comparatively large surface areas in relatively confined environments.

Referring to FIGS. 14 and 15, there are shown perspective and sectional views of an electrode with minor variations for sinking cavities having irregularly shaped bottom and/or side wall surfaces.

Into a metallic header 323 are drilled a multiplicity of holes arranged in a regular pattern. Then metal tubes 325 are fitted into the header holes and their inner ends are expanded slightly by a tapered tool or brazed or otherwise secured to seat, seal, and lock the tubes in the header. The tubes may be straight or, optionally, they may be enlarged at their working ends as shown at 327. The enlargement may be accomplished by electroplating, for example with copper or nickel, to a depth of, say, .005 inch to .010 inch or more. The purpose is to permit close spacing of tubes 325 at their working ends without making it too difficult to fabricate header 323 by requiring exceedingly thin walls between the holes for the tubes. The tube bundle may be made by copper plating stainless steel tubes; then nesting them together and soldering them into the header 323 at one end, and thereafter dipping the working end in nitric acid to eat away the copper and leave the stainless steel so that there is space between the tubes at the working end for exit of electrolyte.

For rough work the tubes may be about $\frac{1}{16}$ inch in diameter and should have center bores about .030 inch for the passage of electrolyte. The spacing between tubes should not exceed $\frac{1}{64}$ inch and this close spacing may be brought about either by close spacing of the header holes or by enlarging the working ends of the tubes and using somewhat more generous spacing of the header holes. To minimize pattern in the work I prefer needles of about .025 inch outside diameter with .010 inch bore and about .010 inch spacing.

A chamber 331 is formed in the header 323 for introducing electrolyte into the tubes, and a cover plate 333 is fastened by bolts to the header. In the cover plate is a centrally located opening threaded to receive a pipe fitting at the end of a rigid supply tube 337, which also serves for mounting the electrode in a feed device; for example, like that of FIG. 1. An electric cable (not shown) brings the negative electrical connection to the header and is convenienty fastened under one of the bolts holding the cover plate 333 to the header 323.

In FIG. 14 there is shown a compound contour at the working end of the tubes 325. This may be shaped by a variety of mechanical means, if so desired. For example, the individual tubes 325 may be precut to the appropriate lengths before being inserted and fastened in header 323.

I prefer, however, to use a process which I believe to be unique to impart the desired shape into the electrode. A master form is made with a shape which is a negative of the shape desired in the electrode. This may be made of metal, or it may be of plastic or plaster with a conductive metal coating. The master form is mounted in the place where the work is ordinarily mounted, and the polarity of the power source is reversed so that the electrode is an anode.

At this point it should be understood that the tubes 325 may terminate roughly on a plane normal to the tube axes. Their ends do not define any special form.

Now, with electrolyte being pumped through the supply tube 337 and through the tubes 325, the electrode assembly is advanced slowly toward the master form. As any tubes approach the master form they are anodically reduced, shortening their length to conform to the shape of the master form. When all of the tubes are far enough advanced to be in active electrolytic relationship with the master form, that is, when all have been shortened somewhat by electrolytic attack, the speed of advance of the electrode is increased as much as possible without causing contact with the master form. Then, simultaneously, the electrolytic current is turned off, and the advance is stopped. By the fast feed for final forming, each tube is brought within .001 inch of the confronting surface of the master form so that any deviation between the form of the master and the form defined by the tube ends is less than .001 inch.

The master is then replaced by a workpiece—for example, a hardened die block—the polarity of the electrical supply is restored to normal so that the work is the anode, and now the form established by the master can be reproduced in the work.

To do this the same procedure is followed as in shaping the electrode. The advance of the electrode is held at moderate speed until all tubes are electrolytically removing work material. Then the speed is increased to the maximum attainable without contact with the work. This maximum is determined by the nature of the work material, the electrolyte, its temperature, its pressure, the voltage, the available current supply, etc. As a practical matter, one learns quite quickly what speeds are suitable under practical operating conditions. For this work where high accuracy is desired, it is good to use electrolyte of lower conductivity made, for example, by diluting a high removal solution with water. By reducing the conductivity, the differential in removal rate between the parts of the electrode in close proximity to the work and those more remote is accentuated so that better conformation between electrode and work is obtained.

It has been found practical to make the tubes 325 of 18-8 stainless steel because this material can be reduced very rapidly for shaping the electrode. Also, the removal is even and the surface is smooth.

When the cavity has been formed by this means, the cavity surface will show the pattern of the tubes 325, but only a relatively small amount of material needs to be removed to smooth the surface to acceptable standards, if the tubes are small and the tube spacing is close.

It should be observed that the spaces between the tubes provide channels for the exhaust of electrolyte.

If desired, the outside tubes, after the electrode has been shaped, may be coated with ceramic so that the side walls of the cavity will not be unduly attacked and removed electrolytically. For many cavities of this general kind, this is not important, but for some it is.

It should also be noted that for fine detail, or where there are steep contours, finer tubes may be and should be used, and I have successfully used tubes of .020 inch in diameter with .010 inch spacing, and probably even smaller tubes could be used, if necessary by providing adequate electrolyte pumping pressure and good filtration to prevent clogging of tubes of fine bore.

FIG. 15 shows an electrode similar to that of FIG. 14 as used for forming grooves 328 in the surface of a rotating workpiece. Here the work, a ring W, is held by chuck jaws 330 and rotated upon a spindle 332. The electrode is supported by the electrolyte supply pipe 337 in a tool rest and advanced into the work as the work rotates. Electrolyte at a pressure of 25 to 200 pounds per square inch is pumped through the electrode. It thus cuts a smooth slot in the workpiece periphery.

In general, the electrode illustrated in FIGS. 14 and 15 is suitable for the rapid removal of work material, particularly where the side walls and bottom surface of the cavity produced in the work may be somewhat rough without this being objectionable. Because of the rotation of the work in FIG. 15, the groove formed will, of course, be smooth.

Figure 17:
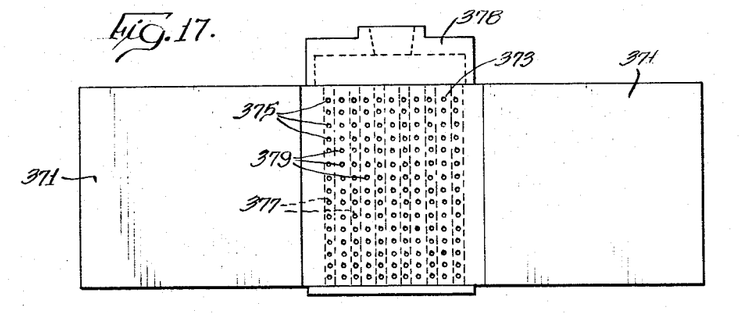
FIG. 17 is a view of the working face of the electrode of FIG. 16.

FIGS. 16 and 17 illustrate another form of electrode which is quite thin and is supported at both ends by mounting tabs 371. These tabs may be clamped in a suitable fixture so as to bring the working face 373 against the surface to be finished. This type of electrode is particularly suitable where the clearances are small, as between turbine blades, for instance.

As with the previous electrodes of this general character, a multiplicity of holes 375 communicate between the working face and channels 377 which extend relatively parallel to the working face. These channels are connected at one or both ends to a manifold 378, the manifold in turn being connected to a source of electrolyte under pressure. Between the hole 375 other holes 379 extend through the electrode from the working face to the back surface thereof so as to provide a means for escape of the electrolyte. As with the other electrodes, the working face of the electrode of FIGS. 16 and 17 may be shaped to the precise working contour by reversing the direction of current supply thereto, and bringing this working face against a master tool so as to deplate the working face of the electrode to the precise desired contour.

Figure 18:
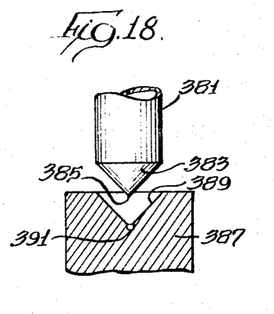
FIG. 18 is a somewhat diagrammatic illustration of the manner in which the cavity produced by an electrode has a contour which is irregular with respect to the electrode under certain conditions.
Figure 19:
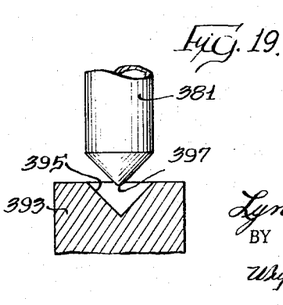
FIG. 19 is a view similar to FIG. 18, illustrating one manner of overcoming the difficulty illustrated in FIG. 18.

One of the advantages of shaping the working face or end of the electrode by electrolytic action is illustrated in FIGS. 18 and 19. In Fig. 18 the tool is indicated generally at 381. This tool may be considered as having a conical nose 383 which is used in shaping a cavity. This nose, however, will not shape a precisely conical hole, since the electrolytic action is greatest at the sharp point indicated at 385. Thus the cavity produced in the work will appear much as that shown in the block 387 immediately therebelow. In this representation it will be noted that the sides of the cavity throughout the major portion of the surface have a conical contour which conforms to the face 383, this conical surface being indicated at 389, but that the extreme bottom center of the cavity will be deepened as indicated at 391. Although it would, of course, be possible to calculate and mechanically modify the end of the electrode 381 so as to avoid this, it is far easier to provide a shaping tool 393 having a conical cavity 395 therein.

If the current is now connected in a reverse direction and the electrode 381 is advanced into this cavity, it will be found that the end of the electrode will be shaped to conical contour, excepting that the extreme end at 397 will be rounded because of the greater electrolytic action at this position. After being so shaped, the conical electrode at 381 with the slightly rounded extreme end can then be used to shape cavities which will be a much closer approximation to the desired truly conical surface.

From the above description of my invention which has been illustrated in several embodiments and variations, the features and applications of the inventive idea to practical problems have been discussed. From this it will be apparent that certain generalizations may be made.

The amount of metal removed from a workpiece by electrolytic action is a direct function of the current in the electrolyzing circuit. The voltage necessary to pass any particular current with any particular set of circumstances will depend upon the spacing between the electrode and the workpiece. It will also depend upon the electrode size or effective area, but for a particular job the electrode size usually will not be a variable.

The cost of operation will vary rather directly with the wattage, that is, the amperage, in the circuit times the voltage necessary to produce the current. From these considerations it follows that from the practical standpoint it is essential that the electrode to workpiece spacing be held to a practical minimum so that minimum voltages may be used, thereby enabling the operation to be conducted at minimum cost. As an example, by following the teachings of the present invention, precisely held small spacings may be used and most electrolyzing operations may be conducted at approximately ten volts, or in some cases, even less with work gaps from half a thousandth to a few thousandths of an inch. The current densities which appear to be most satisfactory as a practical matter are between 100 and 3000 amperes p.s.i. of effective electrode area. The wattage, therefore, is between one and thirty kw. per square inch. For large areas the voltage may be reduced to four volts, while still obtaining reasonable current density.

All prior systems with which I am familiar, which attempt to remove metal by electrolytic action, require far greater total electric energy than this to remove an equivalent amount of metal. Prior workers in this field have found it necessary to use voltages of the order of 100 to 110 volts or more, with the result that the energy requirements, or in other words, the cost of removing the metal, are of the order of ten or more times that required when using the invention discussed above. Furthermore, if low voltages are attempted with wide work gaps, the rate of material removal is low and thus more machines are required to produce the same amount of work. It is apparent, therefore, that regardless of the approach to the problem, the accomplishment of high current densities with low voltages is economically essential.

Also, as previously indicated, high voltages, together with comparatively large work gap spacings, produce an electrolytic action that is far less controllable, and therefore the work produced cannot be as precise as the work produced by using the present invention.

In general, it may be said that simple narrow edged open ended electrodes of the general character illustrated in FIGS. 3, 4, 12 and 13 will cut the most rapidly. They also leave comparatively regular and smooth side walls, but the center of the work acted upon is not cut away as rapidly as the work directly beneath the electrode edge, since it is much farther from the electrode active surface. This is well illustrated in FIG. 3. This electrode, therefore, may be considered as the approved type when it is desired to sink a hole all the way through a workpiece, or under some conditions, where there is to be a subsequent finishing operation, or where the protuberance at the center is of no disadvantage. Under some special circumstances this protuberance may even be an advantage, as in FIG. 3, where it is desired subsequently to upset the end of a member in the hole so as to provide a stud firmly anchored to the work, for instance. In general, everything else being equal, rapid sinking of the electrode into the work will give a higher and sharper protuberance than will slow movement of the electrode. This difference may be appreciated by a comparison of FIG. 3 with FIG. 4. In FIG. 3 the electrode is moving rapidly in order to produce a tapered hole having a small diameter at the bottom, whereas in FIG. 4 the electrode is moving slowly so as to produce a reverse taper.

Where it is desired to sink a cavity having a considerable area at the bottom, and where it is desired that the bottom be of generally controlled contour, but under conditions where both the bottom and side walls may be allowed to be somewhat rough, a multiple tube electrode of the type illustrated in FIG. 14 is highly satisfactory. A smooth finish with this type electrode may be achieved, however, by using small diameter closely spaced tubes or by producing relative movement between the work and the electrode, in addition to simple advance of the electrode, in such manner as continually to expose the end of the electrode to a shifting work surface, for this purpose a vibrator mounted so as to shake the electrode may be used. Another example of this approach is illustrated in FIG. 23.

Air jets may be used to prevent unwanted electrolytic action between side surfaces of the electrode and the work, where the electrode is not in close proximity to the work but where electrolyte is caught in stagnant pockets. The air is used to blast away the stagnant electrolyte. The arrangement of FIG. 1 in which the work is positioned above the electrode is also helpful in eliminating stagnant electrolyte pockets as gravity causes the electrolyte to fall away from the work area. This is the case in forming cavities in the work. Where the part to be produced is a punch or the like so that there is a cavity in the electrode, then the electrode is placed above the work so that gravity helps to clear away the electrolyte except where there is close spacing between the electrode and the work.

A wide variety of electrolytes may be used in the apparatus and processes heretofore described. Some work materials respond to acid solutions of 5% to 25% of the appropriate strong acids such as hydrochloric, nitric, and sulphuric. Other materials, such as cemented carbides, e.g., tungsten, tungsten carbide, titanium carbide, etc., respond better to caustic solutions such as a 20% solution of potassium hydroxide, to which may be added 5% sodium tungstate.

To the extent possible without excessive loss of removal rates, it is preferable to use neutral or nearly neutral salt solutions because they are much easier and safer for routine shop handling. A solution of this type which has shown good versatility and good removal rates may be made by adding to 15 gallons of water the following:

|                    | Pounds |
|--------------------|--------|
| Potassium chloride | 30     |
| Potassium nitrate  | 10     |
| Potassium citrate  | 10     |
| Rochelle salts     | 10     |

This solution, when supplied to the electrode at a temperature between 120° F. and 150° F. will give good removal rates on a wide variety of steels, including stainless steel, and also, a great many of the so called super-alloys of nickel, cobalt, or iron base and containing as alloying materials, in addition to those three, such materials as chromium, molybdenum, tungsten, titanium, columbium, etc.

In addition to removing material at good rates, a good finish is obtained, and particularly on the high alloy stainless steels and the super-alloys, a bright, reflective surface may be created where the surface is exposed to electrolysis under conditions of pressure and high velocity in the electrolyte, as previously explained.

I have found that an essential to good performance of an electrolyte is that the metal salt products of electrolytic decomposition be readily soluble. For example, aluminium is not easily worked by this process with many electrolytes which are usable on other materials, as the anodic action forms aluminum salts which are not very soluble or not soluble at all and form an anodic film on the work. But a simple 5% or 10% solution of acetic acid yields good results because the relatively complex aluminum salts formed are soluble enough to be readily washed out of the work gap.

Where fine detail of pattern is to be reproduced, it is desirable to use a solution which is considerably more dilute than is desirable for maximum removal rates. Thus, the quantities of salts used in the table above are reduced to one-fourth to one-sixth the values shown for the same amount of water. The voltage applied is also reduced. The purpose is to accentuate the difference in removal rate between those areas where the electrode is close to the work and those where it is more remote. If the electrolyte is too conductive and the applied voltage is too high, then the difference in resistance path between areas of close proximity and others of greater spacing is not very great, and the detail of pattern becomes blurred.

Referring to the solution in the table, this has been used successfully in a four-to-one dilution to duplicate coin patterns in the following configuration and procedure. First, a coin is positioned opposite a disc electrode of porous sintered bronze in the form of a disc about one inch in diameter and one-eighth inch thick. The electrolyte is pumped at about 100 p.s.i. through the electrode disc after passing through a filter designed to remove all particles down to five microns. The electrolyzing current is first connected in a sense to make the electrode positive. The electrode is then advanced until it very nearly touches the coin. Then current is turned on at four volts for one or two seconds, the electrode is then advanced, and this is repeated until ample depth has been reached to embrace all of the coin face pattern. Then, the coin is removed and replaced with a piece of die steel, and the power leads are reversed so that the electrode is now a cathode. The electrode is now advanced toward the steel, using a voltage of six volts, and again, very close proximity is used—a few ten-thousandths of an inch of spacing—and the electrode is advanced into the steel to a depth great enough to embrace the pattern. By this means, it has been possible to reproduce fairly fine detail, and in comparing the height of the coin pattern above its flat areas with the finished steel replica, it has been possible to bring these measurements within less than .001 inch of difference between the original coin and the steel pattern. So far as I am aware, such close copying by electrolytic removal means has never been approached before.

In the foregoing description, various parameters have been described with respect to the apparatus components and the steps which are embodied in the method of carrying out the present invention. In the following claims it is intended that the language used in describing the apparatus components and the method steps be related within the range of permissible and reasonable equivalency to the description and disclosure. For example, it has been found that reasonably good results can be obtained by furnishing the electrolyzing direct current within the range of approximately four to 15 volts. Within this approximate range, and depending upon the resistance in the work gap, the current density will usually be in the range of 100 to 3000 or more amperes per square inch. The resistance in the work gap is determined by the width of the gap and the character of the electrolyte therein. Work gaps of less than .001 inch, e.g., .0005 inch, and as great as .012 inch have been described. When the electrolyte is pumped through such gaps at temperatures in the range of 120° F. to 160° F., a pressure of several atmospheres must be used to inhibit bubbling or boiling of the electrolyte and the consequent reduction of its conductivity. Therefore, the electrolyte is pumped through the gap at pressures within the range of 50 p.s.i. to at least 200 p.s.i. to obtain high back pressure in the work gap with a resultant high electrolyte velocity through the work gap, thereby substantially to raise the boiling point level of the electroyte so as to inhibit the formation of gas bubbles in the electrolyte and to flush away the eroded workpiece material.

From the above discussion it will be apparent that although this invention may be used for producing shapes and cavities of an irregular character, such that they would be extremely difficult to form by any other process, the invention also has a high order of utility for replacing more conventional machining operations when the workpiece is one of the super-alloys or other material which is for all practical purposes, largely non-machinable. The embodiment illustrated in FIG. 23, for instance, would not be likely to replace an ordinary turning operation on mild steel or other easily machinable materials, but its superiority is evident upon hardened tool steel or super-alloys, or other non-machinable materials.

From the above description of my invention as embodied in several alternative variations, it will be appreciated that many changes may be made both in the apparatus and in the method without departing from the scope or spirit of the invention, and that the scope of the invention is to be determined from the scope of the accompanying claims.

I claim:

1. In an electrolytic apparatus for removing material from an electrically conductive workpiece by means of an electrode having a conductive working face, said electrode being movable toward and away from said workpiece, means for pumping an electrolyte through the electrode so that said electrolyte escapes from said electrode at the working face, circuit means for impressing an electric potential between the electrode and the workpiece in a sense to make the electrode a cathode, said electrode comprising a member having a working face shaped substantially to the contour to be formed in said workpiece, said member having a plurality of passages formed therethrough to said working face for supplying electrolyte to the working face thereof, and said member having other passage forming means leading from said working face to provide a means of escape of electrolyte from said working face, and the distance across the face of said electrode from said supply passages to said escape passages being not more than three-quarters of an inch.

2. In an electrolytic apparatus for removing material from an electrically conductive workpiece by means of an electrode having a conductive working face, said electrode being movable toward and away from said workpiece, means for pumping an electrolyte through the electrode so that said electrolyte escapes from said electrode at the working face, circuit means for impressing an electric potential between the electrode and the workpiece in a sense to make the electrode a cathode, said electrode comprising a member having a working face shaped substantially to the contour to be formed in said workpiece, said member having a plurality of passages formed therethrough to said working face in spaced relation for supplying electrolyte to the working face thereof, said member having openings formed in said working face to provide escape paths for the electrolyte conducted to said working face, said passages and said openings being so spaced at the working face that the distance between any passage and the most contiguous opening is not more than three-quarters of an inch regardless of the size of said electrode.

3. In an electrolytic apparatus for removing material from an electrically conductive workpiece by means of an electrode having a conductive working face, said electrode being movable toward and away from said workpiece, circuit means for impressing an electric potential between the electrode and the workpiece in a sense to make the electrode a cathode, said electrode comprising a multiplicity of small ducts formed of electroconductive material, means supporting said ducts at one end so as to position the free ends thereof in slightly spaced parallel relation to form said working face, and means including said supporting means for supplying electrolyte for flow through said ducts, whereby the electrolyte is delivered at the electrode working face from the duct free ends and escapes from the working face by way of the spaces between said ducts.

4. In an electrolytic apparatus for removing material from an electrically conductive and electrochemically erodable workpiece by means of an electrode having a conductive working end, said electrode being movable toward and away from the workpiece and when in operating position defining with the workpiece a narrow work gap, said electrode comprising a duct member formed of conductive material, the working end of said duct member being flared outwardly to provide an axially short peripheral lip of larger transverse dimension than the remaining portion of said duct member, said electrode being intimately encased within an insulating sheath extending upwardly from substantially the upper edge of said lip for a substantial distance whereby as said electrode advances into a workpiece the electrolytic action of said electrode will be substantially confined to the working end of said electrode including said lip, means for pumping an electrolyte through the electrode so that said electrolyte exits from said electrode at the working end, and circuit means for impressing a low voltage, direct current between said electrode and the workpiece in a sense to make said electrode a cathode.

5. The combination called for in claim 4, in which the inner surface of said tubular member substantially to the working end thereof is provided with an insulating layer whereby as said electrode advances into a workpiece the electrolytic action of said electrode is confined to the formation of an annular slot.

6. In an electrolytic machining apparatus having means for passing electrical current through an electrolyte from an electrode to a workpiece for eroding a cavity in the workpiece, in combination, feed means for feeding said electrode into the cavity being machined and for maintaining predetermined gap spacing between the machining portion of the electrode and the face of the cavity being eroded in the workpiece during machining, an electrode comprising a support shank portion and a machining portion, the machining portion having a face portion of the shape of the cavity being machined and being reduced in section immediately back of said face portion to provide increased clearance between said reduced section and the cavity wall sufficient to substantially inhibit electrolytic action between said reduced section and the cavity wall.

7. The combination set forth in claim 6 wherein all portions of the electrode except the machining face thereof are coated with an adherent insulating substance.

8. The combination as set forth in claim 6 wherein means is included for introducing the electrolyte into the gap between said electrode and the workpiece under pressure.

9. In an electrochemical machining apparatus having means for passing electrical current across an electrolyte filled gap between a machining electrode and a workpiece and feed means for maintaining a preset constant space relationship between the electrode and the workpiece during machining, in combination, an electrode comprising a machining portion and a supporting shank portion, the machining portion of said electrode having a face portion of the shape of the cavity to be cut, said machining portion being reduced in section immediately back of said face portion to provide increased clearance between said reduced section and the walls of said cavity sufficient to substantially inhibit electrolytic action between the reduced section and the walls of the cavity.

10. The combination set forth in claim 9 wherein all portions of the electrode except the face thereof are coated with insulating material.

11. In an electrolytic machining apparatus having means for passing electrical current through an electrolyte from an electrode to a workpiece for eroding a cavity in the workpiece, in combination, feed means for feeding said electrode into the cavity being machined and for maintaining predetermined gap spacing between the electrode and the workpiece during machining, an electrode comprising a supporting shank portion and a machining portion, the machining portion having a face portion of the shape of the cavity being machined and being reduced in section immediately back of said face portion to provide increased clearance between said reduced section and the cavity wall sufficient to substantially inhibit electrolytic action between said reduced section and the cavity wall, means for introducing coolant into the gap between the electrode and workpiece, and conduit means in said electrode for conducting coolant from the gap through said electrode.

12. The combination set forth in claim 11 wherein all portions of the electrode except the machining face thereof are coated with an adherent insulating substance.

13. The combination as set forth in claim 12 wherein said last mentioned means comprises a conduit located in said machining portion of said electrode.

14. In an electrolytic machining apparatus having means for passing electrical current through an electrolyte from an electrode to a workpiece for eroding a cavity in the workpiece, in combination, an electrode comprising a supporting shank portion and a machining portion, means for feeding the electrode toward the workpiece as the cavity is machined and for maintaining a substantially constant gap between the machining portion of the electrode and the face of the cavity being eroded, said electrode being reduced in section immediately back of said machining portion and all portions of the electrode except the machining portion thereof being coated with an adherent insulating substance whereby electrolytic action between the coated portions of the electrode and the cavity wall is substantially inhibited.

15. The combination set forth in claim 14 wherein means integral with said electrode is provided for introducing the electrolyte under pressure into the gap between the electrode and the workpiece.

16. The combination as set forth in claim 14 wherein an input conduit and an outlet conduit are located in the machining portion of said electrode whereby the electrolyte is circulated through the machining gap in sufficient volume and under sufficient pressure to flush away the eroded particles in the gap.

(References on following page)

References Cited by the Examiner

UNITED STATES PATENTS

| | | | |
|---|---|---|---|
| 2,773,968 | 12/1956 | Martellotti et al. | 219—69 |
| 2,798,849 | 7/1957 | Lindsay | 204—224 |
| 2,826,540 | 3/1958 | Keeleric | 204—224 X |
| 2,939,825 | 6/1960 | Faust et al. | 204—143 |
| 2,967,813 | 1/1961 | Lindsay | 204—143 |
| 3,060,114 | 10/1962 | Sanders | 204—225 |

FOREIGN PATENTS 335,003   9/1930   Great Britain.

WINSTON A. DOUGLAS, *Primary Examiner.*

JOHN R. SPECK, JOHN H. MACK, *Examiners.*

B. JOHNSON, A. B. CURTIS, *Assistant Examiners.*